(12) United States Patent
Huang

(10) Patent No.: US 10,331,364 B2
(45) Date of Patent: Jun. 25, 2019

(54) METHOD AND APPARATUS FOR PROVIDING HYBRID MODE TO ACCESS SSD DRIVE

(71) Applicant: Yiren Ronnie Huang, San Jose, CA (US)

(72) Inventor: Yiren Ronnie Huang, San Jose, CA (US)

(73) Assignee: CNEX Labs, Inc., San Jose, CA (US)

( * ) Notice: Subject to any disclaimer, the term of this patent is extended or adjusted under 35 U.S.C. 154(b) by 0 days.

(21) Appl. No.: 15/294,547

(22) Filed: Oct. 14, 2016

(65) Prior Publication Data

US 2017/0109089 A1    Apr. 20, 2017

Related U.S. Application Data

(60) Provisional application No. 62/242,675, filed on Oct. 16, 2015.

(51) Int. Cl.
*G06F 3/06* (2006.01)
*G06F 13/42* (2006.01)

(52) U.S. Cl.
CPC .......... *G06F 3/0622* (2013.01); *G06F 3/0625* (2013.01); *G06F 3/0661* (2013.01); *G06F 3/0685* (2013.01); *G06F 3/0688* (2013.01); *G06F 13/4282* (2013.01)

(58) Field of Classification Search
CPC .... G06F 3/0661; G06F 3/0604; G06F 3/0608; G06F 3/0626; G06F 12/0292; G06F 12/0238; G06F 12/0246; G06F 12/0893; G06F 2212/72; G06F 2212/7201
See application file for complete search history.

(56) References Cited

U.S. PATENT DOCUMENTS

| | | |
|---|---|---|
| 2002/0165870 A1 | 11/2002 | Chakraborty |
| 2009/0198902 A1* | 8/2009 | Khmelnitsky ...... G06F 12/0246 711/135 |
| 2011/0238886 A1* | 9/2011 | Post .................... G06F 12/0246 711/103 |

(Continued)

OTHER PUBLICATIONS

C. Wang and W. Wong, "TreeFTL: Efficient RAM Management for High Performance of NAND Flash-based Storage System". Proceedings of Design, Automation, and Test in Europe (DATE 13), pp. 374-379, 2013.*

*Primary Examiner* — Tracy A Warren
(74) *Attorney, Agent, or Firm* — James M. Wu; JW Law Group

(57) ABSTRACT

A system configuration containing a host, solid state drive ("SSD"), and controller able to perform a hybrid mode non-volatile memory ("NVM") access is disclosed. Upon receiving a command with a logical block address ("LBA") for accessing information stored in NVM, a secondary flash translation layer ("FTL") index table is loaded to a first cache and entries in a third cache is searched to determine validity associated with stored FTL table. When the entries in the third cache are invalid, the FTL index table in the second cache is searched to identify valid FTL table entries. If the second cache contains invalid FTL index table, a new FTL index table is loaded from NVM to the second cache. The process subsequently loads at least a portion of FTL table indexed by the FTL index table in the third cache.

20 Claims, 10 Drawing Sheets

(56) References Cited

U.S. PATENT DOCUMENTS

| | | |
|---|---|---|
| 2011/0252210 A1 | 10/2011 | Davies |
| 2013/0124794 A1 | 5/2013 | Bux et al. |
| 2013/0193439 A1 | 8/2013 | Kurotsuchi et al. |
| 2014/0215129 A1 | 7/2014 | Kuzmin et al. |
| 2014/0281151 A1 | 9/2014 | Yu et al. |
| 2014/0304453 A1* | 10/2014 | Shao .................. G06F 12/0246 711/103 |
| 2015/0347026 A1 | 12/2015 | Thomas |
| 2015/0378605 A1 | 12/2015 | Huang |
| 2017/0083454 A1* | 3/2017 | Ramalingam ....... G06F 12/1081 |

\* cited by examiner

METHOD AND APPARATUS FOR PROVIDING HYBRID MODE TO ACCESS SSD DRIVE

PRIORITY

This application claims the benefit of priority based upon U.S. Provisional Patent Application having an application Ser. No. 62/242,675, filed on Oct. 16, 2015, and entitled "Method and Apparatus for Providing Hybrid Mode to Boot SSD Drive," which is hereby incorporated herein by reference in its entirety.

FIELD

The exemplary embodiment(s) of the present invention relates to the field of semiconductor and integrated circuits. More specifically, the exemplary embodiment(s) of the present invention relates to non-volatile memory storage and devices.

BACKGROUND

A typical solid-state drive ("SSD"), which is also known as a solid-state disk, is, for example, a storage device capable of persistently remember stored information or data. A conventional SSD technology, for instance, employs a set of standardized user or device interfaces that allow other systems to access its storage capacities. The standardized interfaces or input/output ("I/O") standards generally are compatible with traditional I/O interfaces for other non-volatile memories such as hard disk drives. In one example, SSD uses non-volatile memory components to store and retrieve data for one or more processing systems.

To store data persistently, various types of non-volatile memories ("NVMs") such as flash based or phase change memory ("PCM") may be used. The conventional flash memory capable of maintaining, erasing, and/or reprogramming data can be fabricated with several different types of integrated circuit ("IC") technologies such as NOR or NAND logic gates with floating-gates. Depending on the applications, a typical memory access of flash memory can be configured to be a block, a page, a word, and/or a byte.

To properly map or translate between a logical block address ("LBA") of a host device and a physical page address ("PPA") of NVM, a flash translation layer ("FTL") table is used for address mapping. The FTL table is typically a flash file system. With increasing in NVM storage capacity, the size of FTL table has become immensely large. Note that LBA is used to address a block of data seeing by an input and output ("IO") device of SSD while PPA addresses a physical storage location where the data is actually stored.

A drawback, however, associate with a conventional SSD containing NVM is that the memory controller typically requires a substantial amount of random access memory ("RAM") for access operation such as storing FTL tables and buffering data.

SUMMARY

One embodiment of the present invention discloses a system configuration containing a solid-state drive ("SSD") having non-volatile memory ("NVM"), controller, flash translation layer ("FTL") table, and a host. The controller is configured to facilitate a hybrid mode to access NVM for storing data persistently. In one embodiment, upon receiving a command with a logical block address ("LBA") for accessing information stored in NVM, the controller loads a secondary flash translation layer ("FTL") index table to a first cache and searches the entries in a third cache to determine validity associated with stored FTL table. When the entries in the third cache do not contain valid information, the FTL index table in a second cache is searched to identify valid FTL table entries. If the second cache contains invalid FTL index table, a new FTL index table is loaded from NVM to the second cache. The controller subsequently loads at least a portion of FTL table indexed by the FTL index table in the third cache.

Additional features and benefits of the exemplary embodiment(s) of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
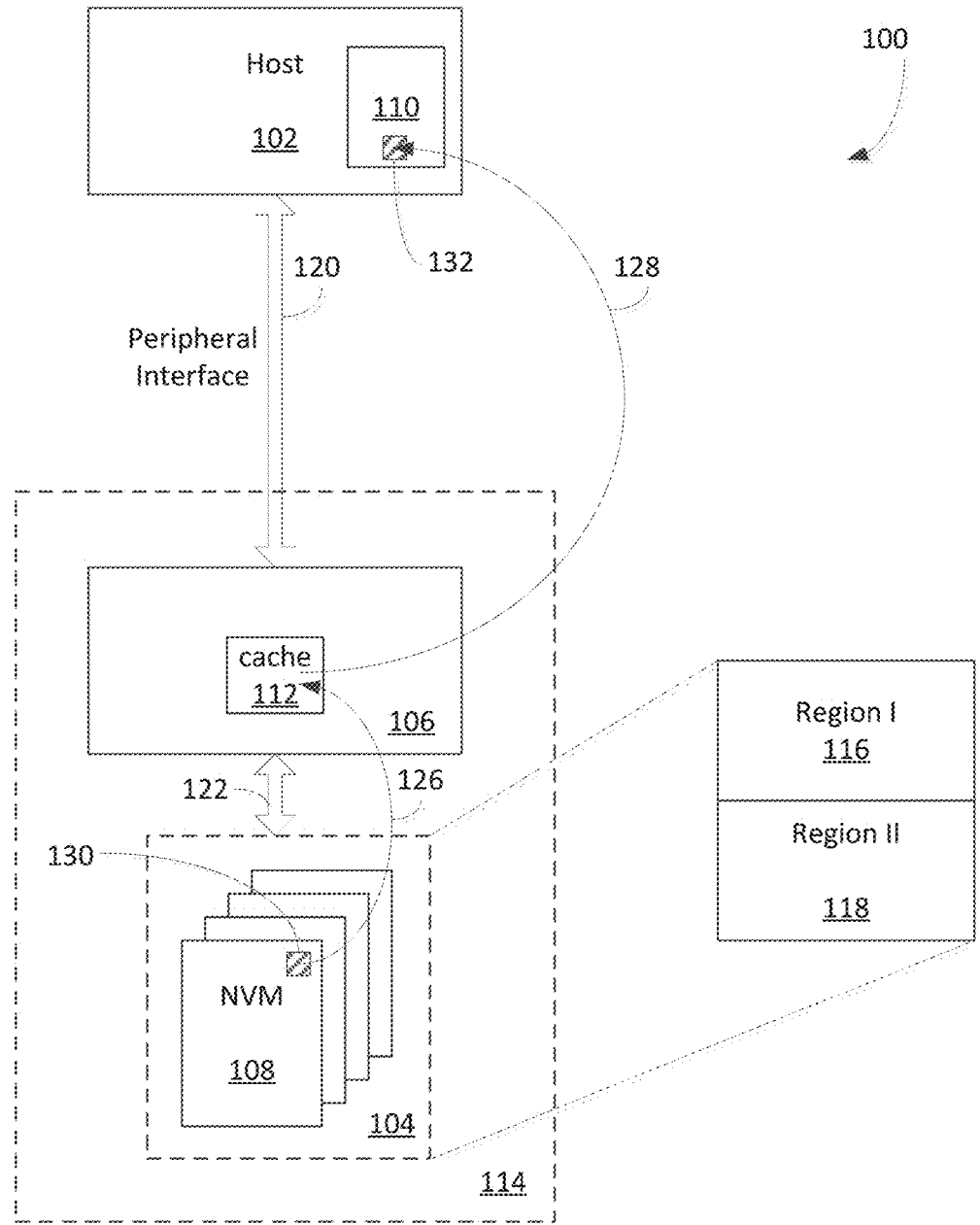
FIG. 1 is a block diagram illustrating a configuration or system configuration providing a hybrid mode to leverage host memory in accordance with one embodiment of the present invention.

Exemplary embodiments of the present invention are described herein in the context of a methods, system and apparatus of facilitating a hybrid mode memory operation for accessing NVM device(s).

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

In accordance with the embodiment(s) of present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, PCM, Jump Drive, and the like), magnetic storage medium (e.g., tape, magnetic disk drive, and the like), optical storage medium (e.g., CD-ROM, DVD-ROM, paper card and paper tape, and the like), phase change memory ("PCM") and other known types of program memory.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to the block and flow diagrams, are typically performed in a different serial or parallel ordering and/or by different components and/or over different connections in various embodiments in keeping within the scope and spirit of the invention.

One embodiment of the present invention discloses a system configuration containing a solid-state drive ("SSD") capable of handling a hybrid mode to access non-volatile memory ("NVM"). In one aspect, a memory controller or controller facilitates a method of hybrid mode for accessing NVM via leveraging the host memory. In one embodiment, upon receiving a command with a logical block address ("LBA") for accessing information stored in NVM, the process of a digital processing system loads a secondary flash translation layer ("FTL") index table to a first cache (or secondary index cache) and subsequently searches the entries in a third cache (or FTL cache) to determine whether currently stored entries of FTL table are valid. If the entries in the third cache are invalid, the FTL index table in a second cache (or index cache) is searched to identify valid FTL table entries. If the second cache contains invalid FTL index table, a new FTL index table is loaded from NVM to the second cache. The process subsequently loads at least a portion of FTL table indexed by the FTL index table in the third cache or FTL cache.

FIG. 1 is a block diagram 100 illustrating a configuration or system configuration providing a hybrid mode to leverage host memory in accordance with one embodiment of the present invention. Diagram 100 includes a host 102, SSD 114, and peripheral interface 120 wherein host 102 includes a host memory or main memory 110. SSD 114 includes a controller 106 and NV storage 104 wherein controller 106 is configured to facilitate a hybrid mode for NVM access. It should be noted that the underlying concept of the exemplary embodiment(s) of the present invention would not change if one or more blocks (or devices) were added to or removed from diagram 100.

NV storage 104 is a storage device capable of storing data persistently. NV storage 104 includes NVM 108 for data storage. To implement the hybrid mode of NVM access, NVM 108, in one embodiment, is organized or partitioned its memory space into two regions 116-118 for handling different modes. Different modes, for example, involves handling NVM access by non-volatile memory express ("NVMe") protocol and non-volatile memory express ("NVM++"). In one aspect, region I 116 is a dedicated storage region for a mode access such as NVMe using LBAs and region II 118 is a dedicated storage region for NVM++ using physical page addresses ("PPAs"). Alternatively, NVM 108 is organized as one region and FTL table(s) is configured to handle multiple modes concurrently. Note that NVM can be any types of NV storage cells including flash memory and phase change memory ("PCM").

To simplify forgoing discussion, only flash memory is used as an exemplary NVM. To operate a hybrid mode, NVM 108 is configured to handle more than one access protocol such as NVMe and NVM++. NVM 108, in one embodiment, stores an address mapping table or FTL table 130 for accessing NVM more efficiently. For example, to quickly locate relevant NVM page(s), controller 106 uses an address mapping table 130 to locate the physical page location within NVM 108.

Address mapping table 130 is organized to include multiple entries for NVM access. Each entry of address mapping table 130 contains an address pointing to a physical page within NVM 108. In one aspect, address mapping table 130 is a flash translation layer ("FTL") table containing information to facilitate translation between logic address and physical pages.

Memory controller or controller 106 includes a cache 112 configured to cache at least a portion of FTL table 130, an index table, and a secondary index table for quick NVM references. Cache or cache memory 112 can be DRAM, RAM, and/or SRAM. The index table is used to index FTL table and a secondary index table is used to index the index table. In one aspect, memory controller 106 is configured to interface NVM++ based interface as well as NVMe based interface. NVM++ uses PPAs to access NVM 108 while NVMe uses LBAs to access NVM 108.

Host or host system 102 includes a processor and host CPU memory 110 which can be at least a part of main memory. Host memory or host CPU memory 110, in one embodiment, includes a copy of the entire address mapping table or FTL table and index table as indicated by numeral 132 for NVM access. Alternatively, host memory 110 caches a portion of FTL table 130 and index table to conserve host CPU memory.

Peripheral interface 120, in one example, can be a high-speed serial connection such as PCIe (peripheral component interface express). Note that PCIe is a serial computer expansion bus for high-speed interface used in SSD configuration. During a SSD boot phase, controller 106, for example, uses NVMe protocol via PCIe over connection 120 to copy at least a portion of FTL table 130 to host CPU memory 110 as indicated by numeral 126-128. After host CPU memory 110 contains a copy of FTL table and index table as indicated by numeral 132, controller can access NVM 108 via connection 122 using hybrid mode such as NVMe and/or NVM++.

To improve access speed to an FTL table, a portion of the FTL table or a portion of the FTL entries is cached using DRAM or RAM in controller 106 as well as host memory 110 whereby the search time or access time to the FTL table may be reduced. Caching a portion of the FTL table can also improve data loss due to unexpected power loss. FTL cache circuit ("FCC"), for example, is used to determine which portion of the FTL table in NVM should be cached to memory 110 as indicated by numeral 128. FCC, in one example, employs the least recently used ("LRU") page or linked list for the FTL cache page swap. FCC also provides data synchronization between the content in the FTL cache pages in memories 110-112 and the content in the FTL pages in NVM.

The FTL cache pages located in memory 110 or 112 is operable to store a portion of FTL table or a set of entries in the FTL table. The FTL pages located in NVM is used to store entire FTL tables persistently. To swap out content of FTL cache pages in memory 110 or 112 for making storage space for caching operation, the swapped out content, in one example, needs to be synchronized with the corresponding content stored in the FTL pages in the NVM. The content of the swapped out FTL cache page(s) is merged with the content of FTL page and subsequently store the merged content back to the FTL page.

Upon occurrence of unintended system power down or crash, the FTL cache page containing the recent updates of mapping information could be lost if it is not properly saved. In one embodiment, the FTL cache pages in memory 110-112 are quickly stored in a predefined section of NVM before the power terminates. Upon recovery of NVM 108, FTL cache or cache page can be restored or recovered. In one embodiment, a technique of FTL snapshot with FTL index table is used for FTL cache restoration.

An advantage of using hybrid mode is to use host CPU memory for caching FTL table(s) to conserve storage resource(s) in SSD or controller.

Figure 2:
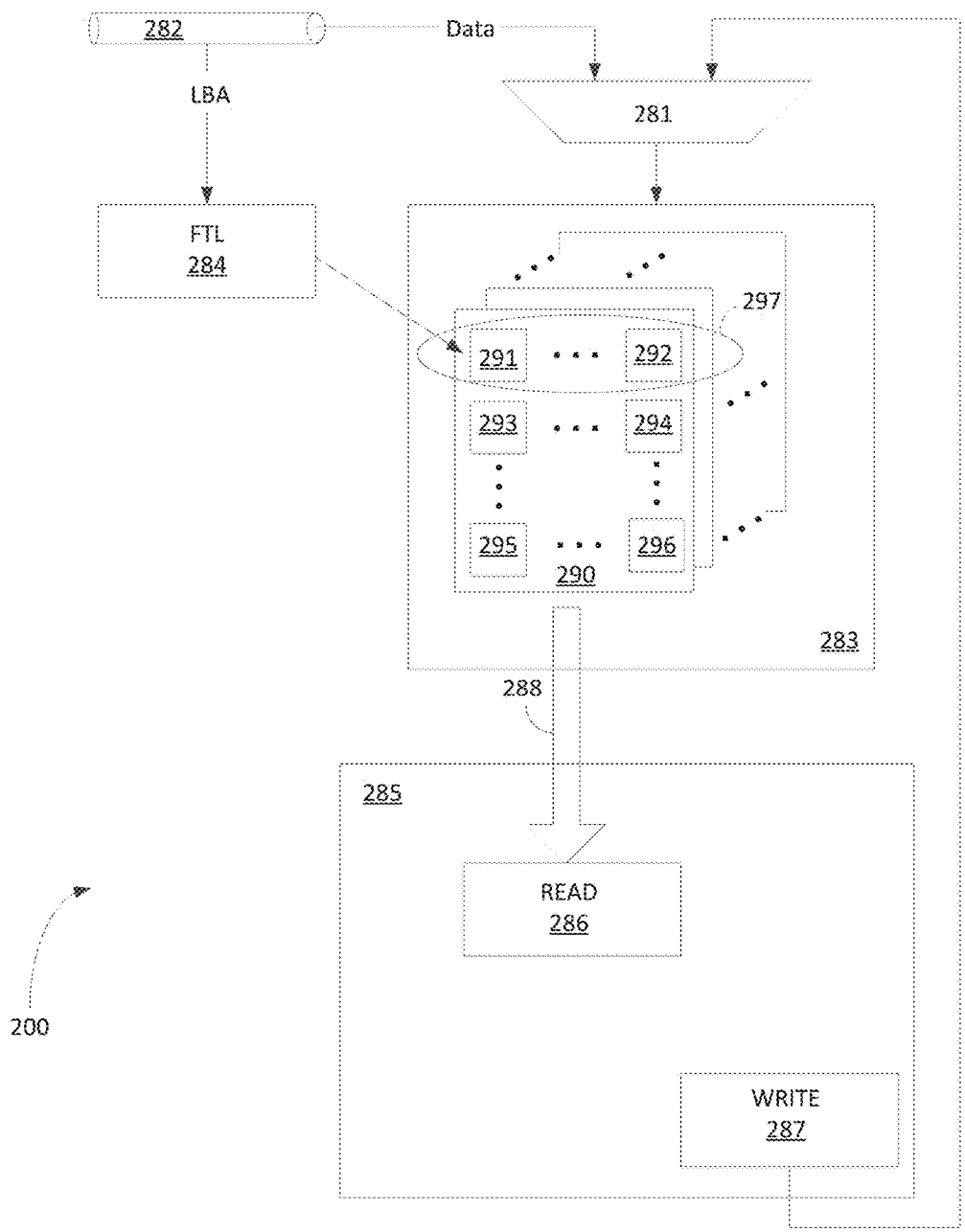
FIG. 2 is a block diagram illustrating a storage system using an FTL table to access NVM in accordance with one embodiment of the present invention.

FIG. 2 is a block diagram 200 illustrating a storage system using an FTL table to access NVM in accordance with one embodiment of the present invention. Diagram 200 includes input data 282, memory or storage device 283, output data 288, and storage controller 285. Storage controller 285 further includes read module 286 and write module 287. Diagram 200 also includes a flash translation layer ("FTL") 284 which can be part of storage controller 285. FTL 284, for example, maps logic block addresses ("LBAs") to physical addresses. It should be noted that the underlying concept of the exemplary embodiment(s) of the present invention would not change if one or more blocks (or devices) were added to or removed from diagram 200.

A flash memory based SSD, for example, includes multiple arrays of NAND based flash memory cells for storage. The flash memory, which generally has a read latency less than 100 microseconds ("μs"), is organized in a block device wherein a minimum access unit may be set to four (4) kilobyte ("Kbyte"), eight (8) Kbyte, or sixteen (16) Kbyte memory capacity depending on the flash memory technology. Other types of NV memory, such as phase change memory ("PCM"), magnetic RAM ("MRAM"), STT-MRAM, or ReRAM, can also be used. To simplify the forgoing discussion, the flash memory or flash based SSD is herein used as an exemplary NV memory for hybrid mode access.

Diagram 200 illustrates a logic diagram of SSD using flash memory 283 to persistently retain information without power supply. The SSD includes multiple non-volatile memories or flash memory blocks ("FMB") 290, FTL 284, and storage controller 285. Each of LBs 290 further includes a set of pages 291-296 wherein a page has, for example, a block size of 4096 bytes or 4 Kbyte. In one example, FMB 290 can contain from 128 to 512 pages or sectors or blocks 291-296. A page or block is generally a minimal writable unit. It should be noted that the terms "block", "page", "chunk", and "sector" can be herein used interchangeably.

In operation, upon receipt of LBA from input data 282, controller 285 looks up FTL table 284 to identify location of NVM page(s). In one example, FTL table 284 converts LBA to physical address or PPA based on information in the entry of FTL table 284. Once PPA is identified, controller writes data to NVM based on PPA as indicated by numeral 297 if it is a write operation.

To operate a bootable drive using NVMe with DRAM less mode, controller activates a bootable process with NVMe mode FTL cache. Upon executing boot operating system ("OS"), FTL driver is loaded for host based FTL. Once the FTL driver is loaded and device is booted from OS, controller can switch to work in NVM++ mode. The host based FTL driver can be subsequently used for NVM++ data space.

An advantage of employing FTL table in a hybrid mode is that it facilitates conversion of logical address to physical address efficiently.

Figure 3:
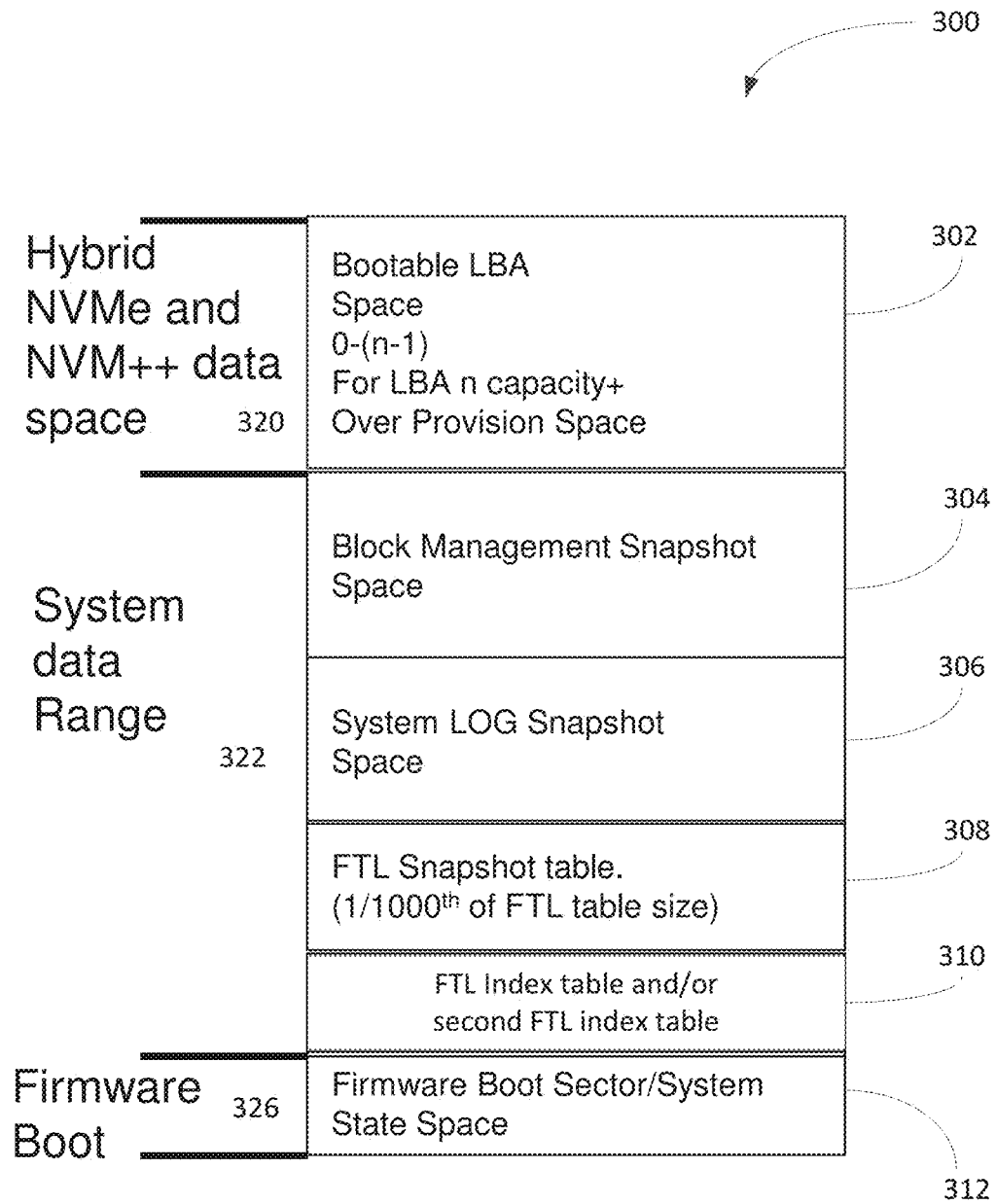
FIG. 3 is a block diagram illustrating storage regions in an NVM storage device capable of operating hybrid mode in accordance with one embodiment of the present invention.

FIG. 3 is a block diagram 300 illustrating storage regions in an NVM storage device capable of operating hybrid mode in accordance with one embodiment of the present invention. Diagram 300 shows an exemplary NVM storage capacity having a user data range 320, system data range 322, and firmware boot range 326. Firmware boot range 326 includes firmware boot sector and system state space 312 used for system boot and/or recovery. For example, firmware boot sector 312 stores information in a storage space for system reboot. In one aspect, a single level cell ("SLC") mode can be used to avoid firmware boot sector corruption. Alternatively, firmware can also use firmware space 312 for storing state variables for system reboot or power up. It should be noted that the underlying concept of the exemplary embodiment(s) of the present invention would not change if one or more blocks (or ranges) were added to or removed from diagram 300.

In one aspect, user data range 302 is a hybrid NVMe and NVM++ via LBA and PPA modes. Range 302 includes bootable LBA space and user LBA space with LBA n capacity where n is the total number of LBA or pages. The regular user data is stored in range 302. Note that LBA mapped in range 302 can be user LBA space from 1 to n−1 if the capacity of an NVM device drive has n pages or LBA. Note that the actual physical space allocated for user data range is usually n*(1+op1) where "op1" is the provision percentage for the user data range.

System data range 322, in one example, is divided into block management snapshot space 304, system log snapshot space 306, FTL snapshot table 308, and FTL index table 310. Space 304 is used for storing block management related information and space 306 logs system log snapshot for device management. FTL snapshot table maps LBA in response to FTL index table 310 which is further used to index FTL snapshot table. While information relating to FTL table is used for FTL caching operation, system log snapshot and/or FTL information are used for system recovery. The LBA mapped to the system data range can be system LBA space from 1 to m−1 if the system data range is m, where m is the total pages or capacity of the system data range. The actual physical space allocated for the system data range, in one example, is m*(1+op2) where "op2" is the provision percentage for the system data range. In one aspect, FTL snapshot table 308 and FTL index tables 310 can be configured to handle hybrid mode. For example, FTL table 308 is configured to recognize NVMe mode or NVM++ mode and process hybrid mode accordingly.

Figure 4:
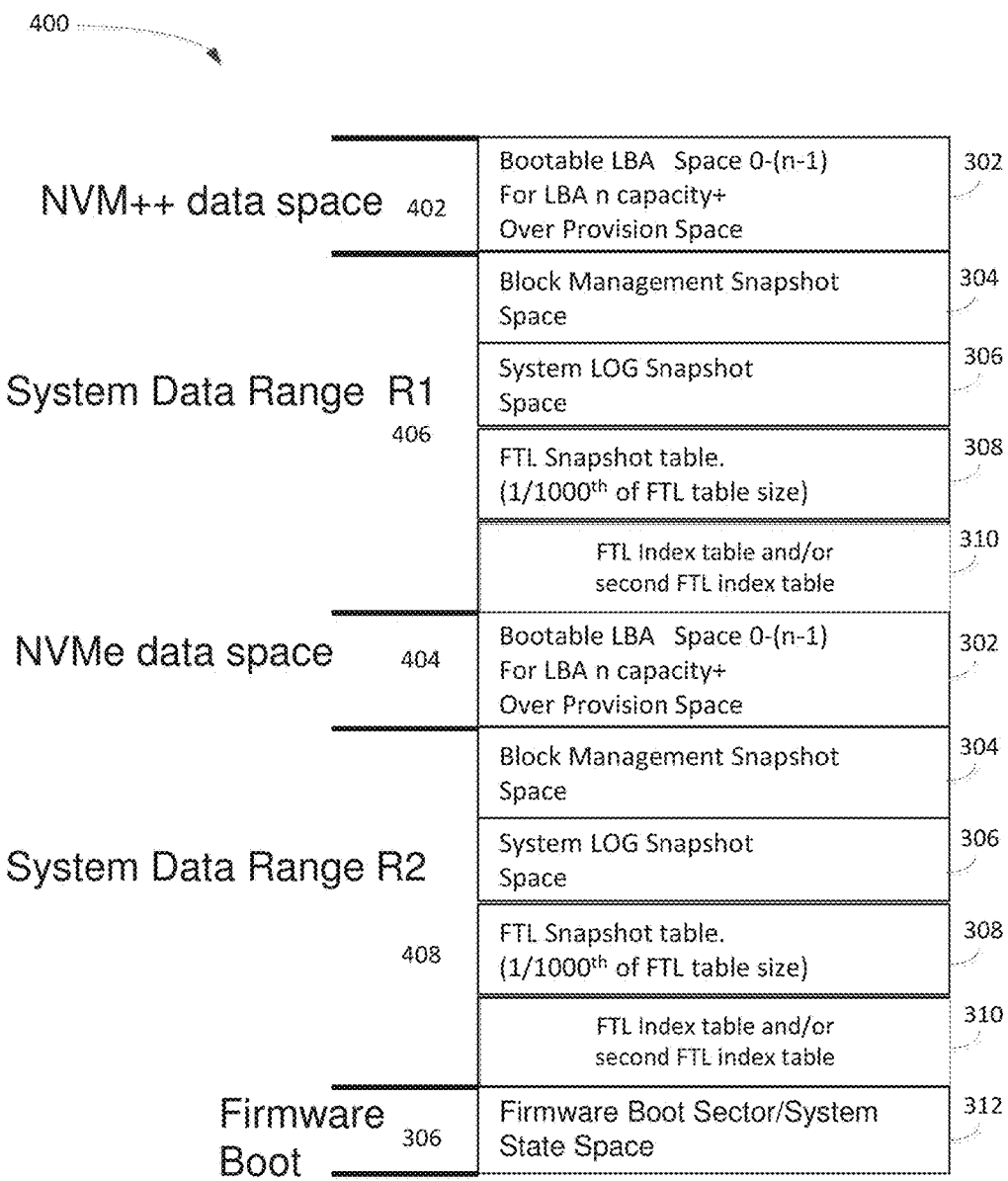
FIG. 4 is a block diagram illustrating storage regions in an NVM storage device capable of operating hybrid mode using partitioned NVM cells in accordance with one embodiment of the present invention.

FIG. 4 is a block diagram 400 illustrating storage regions in an NVM storage device capable of operating hybrid mode using partitioned NVM cells in accordance with one embodiment of the present invention. Diagram 400 is similar to diagram 300 shown in FIG. 3 except that storage range is partitioned into two sections for handling hybrid mode. For example, data range and system range are repeated twice for two modes. In one embodiment, diagram 400 includes one firmware boot range 306, two data space 402-404, and two system range 406-408. For example, data space 402 is designated to handle NVM++ mode while data space 404 is designated to handle NVMe mode. Similarly, system data range R1 406 is used for NVM++ mode while system data range R2 408 is used for NVMe mode.

Figure 5:
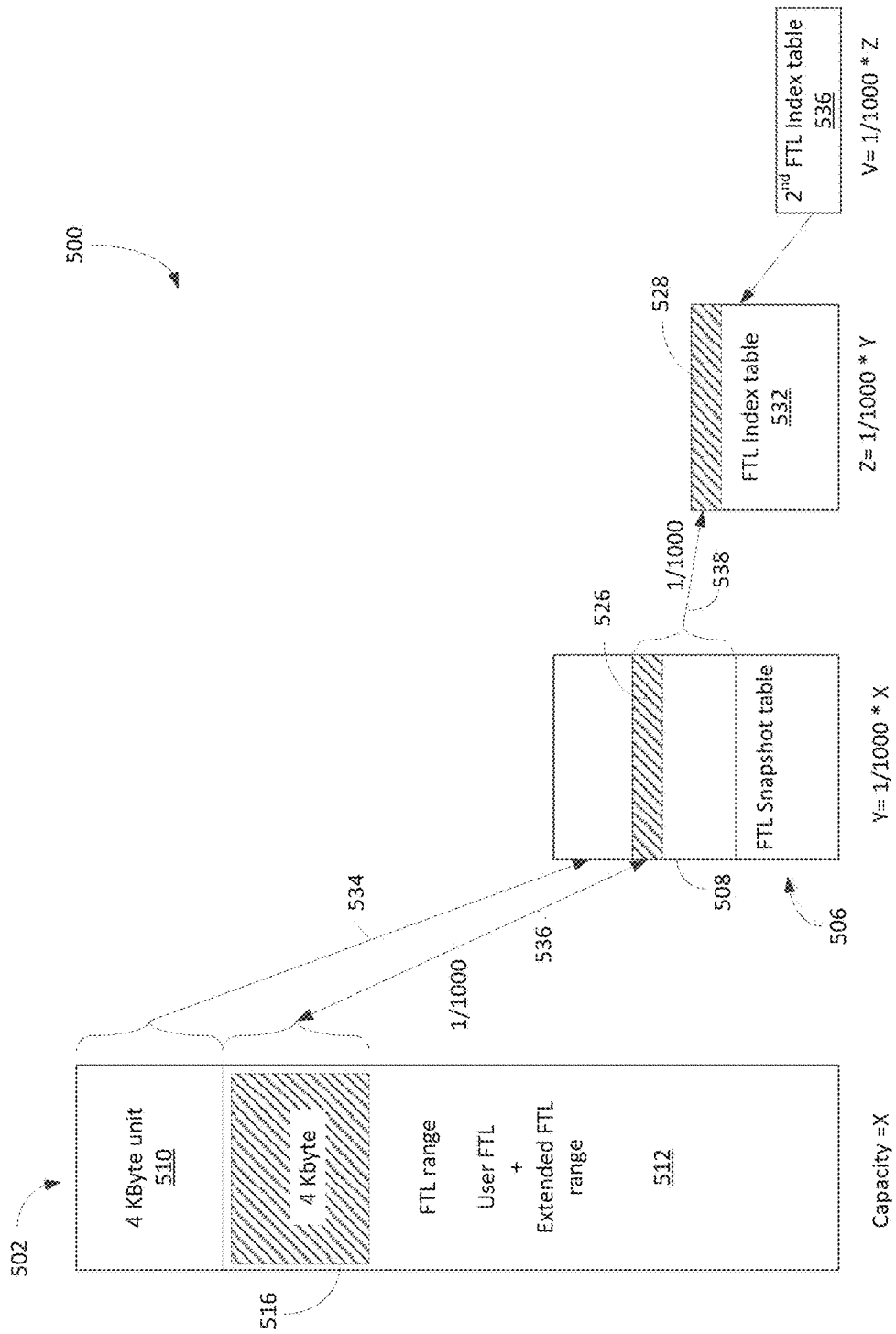
FIG. 5 is a logic diagram illustrating memory access to an NVM device using FTL tables in accordance with one embodiment of the present invention.

FIG. 5 is a logic diagram 500 illustrating memory access to an NVM device using FTL tables in accordance with one embodiment of the present invention. Diagram 500 includes a storage area 502, FTL snapshot table 506, and FTL index table 532, $2^{nd}$ (secondary) FTL index table 536. Storage area 502 includes storage range 512 and an extended range 510. Storage range 512 can be accessed by user through FTL range as well as extended FTL range. FTL snapshot table 506 is a stored FTL database at a giving time. In one embodiment, FTL snapshot table 506 is stored at extended FTL range 510 as indicated by numeral 534. It should be noted that the underlying concept of the exemplary embodiment(s) of the present invention would not change if one or more blocks (or ranges) were added to or removed from diagram 500.

Each entry of FTL database or FTL snapshot table such as entry 526 is set to a predefined number of bytes such as four (4) bytes. Entry 526 of FTL snapshot table 506, in one example, points to 4 Kbyte data unit 516 as indicated by numeral 536. FTL snapshot table 506 is approximately $1/1024^{th}$ of the LBA range which includes user and extended ranges (or storage area) 512. If storage area 512 has a capacity of X, FTL snapshot table 506 is $1/1000$ multiples with X. For example, if storage area 512 has a capacity of 512 gigabyte ("GB"), FTL snapshot table 506 should be approximately 512 megabyte ("MB") which is $1/1000 \times 512$ GB.

FTL index table 532 is approximately $1/1024^{th}$ of FTL snapshot table 506 since each entry 528 of FTL index table 532 points to 4 Kbyte entry 508 of FTL snapshot table 522. If FTL snapshot table has a capacity of Y which is X/1000 where X is the total capacity of storage area 512, FTL index table 532 is $1/1000$ multiples Y. For example, if FTL snapshot table 506 has a capacity of 512 MB, FTL index table 532 should be approximately 512 kilobyte ("KB") which is $1/1000 \times 512$ MB. In one embodiment, FTL index table 532 is used to reference or index FTL snapshot. FTL snapshot table 506, for example, is $1/1024^{th}$ of the LBA range including user and extended LBA ranges. Note that every 4-byte entry of PPA (physical page address) points to four (4) KByte data unit in the LBA range. FTL index table 532 should be $1/1024^{th}$ of the FTL snapshot table size. Each entry of the FTL index table will point to one 4-KByte or 1K entries in the FTL snapshot table.

$2^{nd}$ FTL index table 536 is approximately $1/1000^{th}$ of FTL index table 532. For example, if FTL index table 532 has a capacity of 512 KB, $2^{nd}$ FTL index table 536 should be approximately 512 byte which is $1/1000 \times 512$ KB. A function of $2^{nd}$ FTL index table 536 is to identify an entry at FTL index table 532 quickly.

Before powering down, $2^{nd}$ FTL index table 536, FTL index table 532, and FTL table 506 are saved or stored at space 516. Based on the stored FTL table, the FTL index table such as table 532 is loaded into the memory during a system boot up whether that is inside the host CPU memory or controller attached memory.

Figure 6:
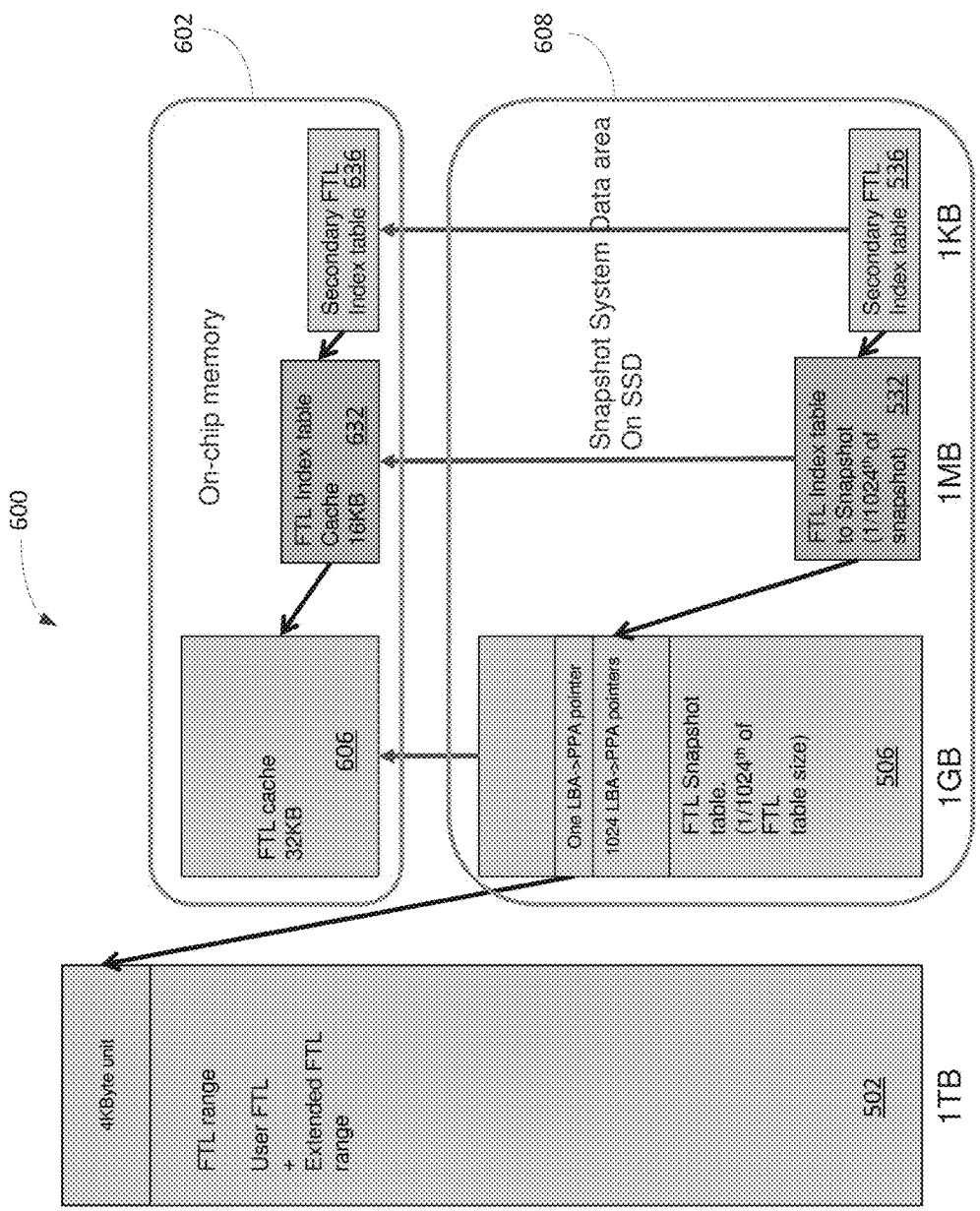
FIG. 6 is a block diagram illustrating an on-chip memory used to cache a portion of FTL table and FTL index tables in accordance with one embodiment of the present invention.

FIG. 6 is a block diagram 600 illustrating an on-chip memory used to cache a portion of FTL table and FTL index tables in accordance with one embodiment of the present invention. Diagram 600 includes NVM storage area 502, on-chip memory 602, and snapshot system data 608. On-chip memory 602, in one embodiment, is onboard cache memory in the controller which is used to manage NVM storage area 502. In one aspect, memory 602 is operable as three caches or cache regions 606-636. Cache or cache region 636, in one example, as known as a first cache or $2^{nd}$ index table cache, is used for caching the entire $2^{nd}$ FTL index table from NVM to controller. Cache or cache region 632, as known as a second cache or FTL index table cache, is used for caching the entire FTL index table. Cache or cache region 606, as known as a third cache or FTL table cache, is used for caching a portion of FTL table. In one aspect, the cache scheme is used to cache necessary portion of FTL data during NVM access operation for hybrid mode.

In a case of DRAM less mode, secondary FTL index table 536, for example, is first loaded to $2^{nd}$ index table cache 636. A DRAM less mode means no DRAM storage memory in either controller or SSD. Upon receipt of an LBA read or write command, the FTL cache is looked up in memory 602. If the cache entry is a miss, FTL index table cache 632 is looked up. If FTL index table cache 632 is also a miss, secondary FTL index table 536 at cache 636 is looked up and new FTL index table (i.e., 4 Kbyte) is loaded from NVM storage area 502 into FTL index table cache 632 in memory 602. In one example, four (4) Kbyte of FTL table is subsequently cached into FTL cache 606.

Figure 7:
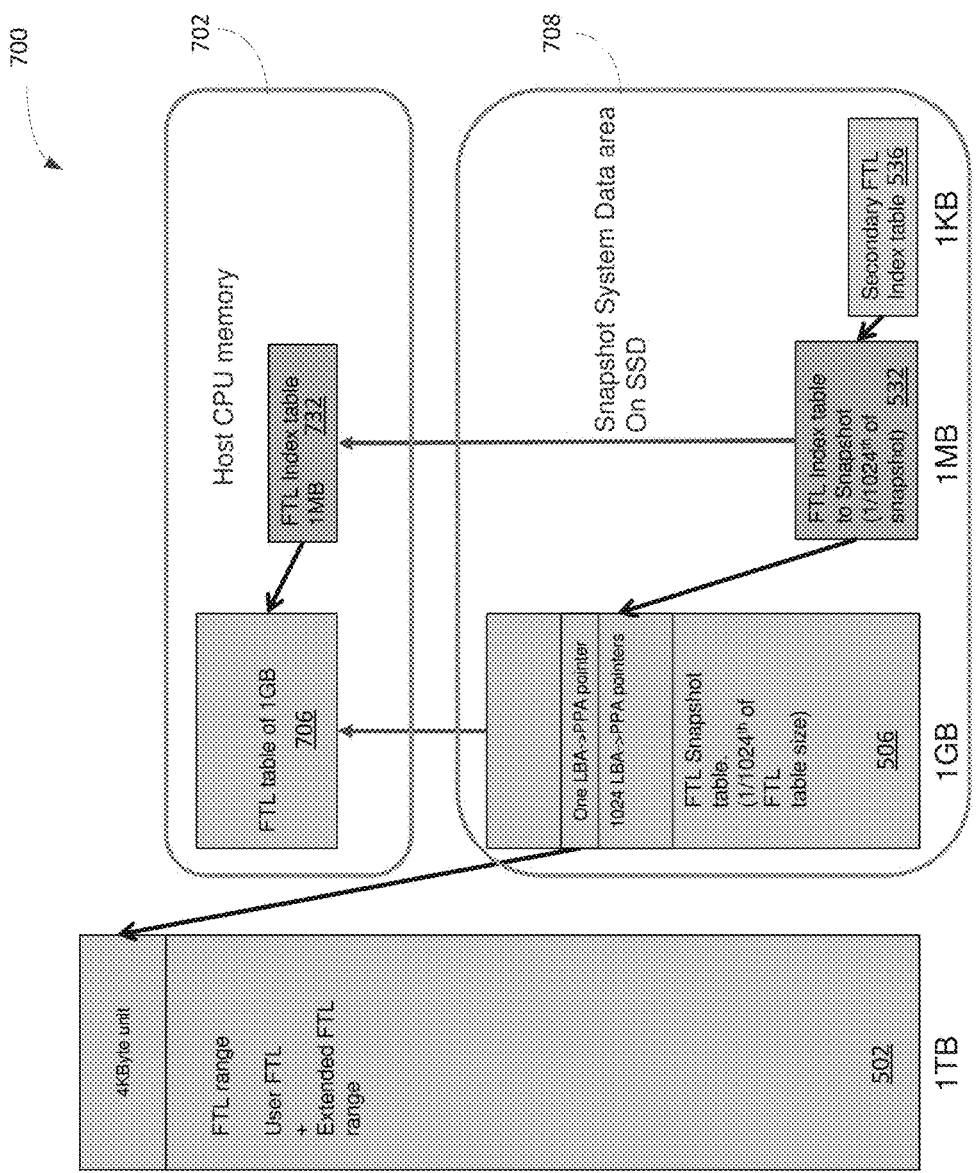
FIG. 7 is a diagram illustrating a host CPU memory containing FTL table for NVM access in accordance with one embodiment of the present invention.

FIG. 7 is a diagram 700 illustrating a host CPU memory containing FTL table for NVM access in accordance with one embodiment of the present invention. Diagram 700, which is similar to diagram 600 shown in FIG. 6 except that replacing on-chip memory with host memory, includes NVM storage area 502, host CPU memory 702, and snapshot system data 708. Memory 702, in one embodiment, is onboard memory at a connected host. The host can be a computer, server, mainframe, workstation, portable system, and the like. In one aspect, memory 702 is used instead of RAM or DRAM storage space in SSD or controller for NVM access. Memory 702 can be a high-speed low volume volatile memory used for executions and operations. In one aspect, memory 702 stores the entire FTL table 706 and entire FTL index table 732.

Utilizing host memory for storing FTL table instead of using storage space in controller can improve overall NVM access speed while conserving storage space in the controller. In one aspect, during a host based FTL mode, the FTL index table is loaded into the host CPU memory and load FTL table or partial FTL table into host CPU memory for NVM access.

An advantage of using the host CPU memory is to conserve storage space in memory controller.

Figure 8:
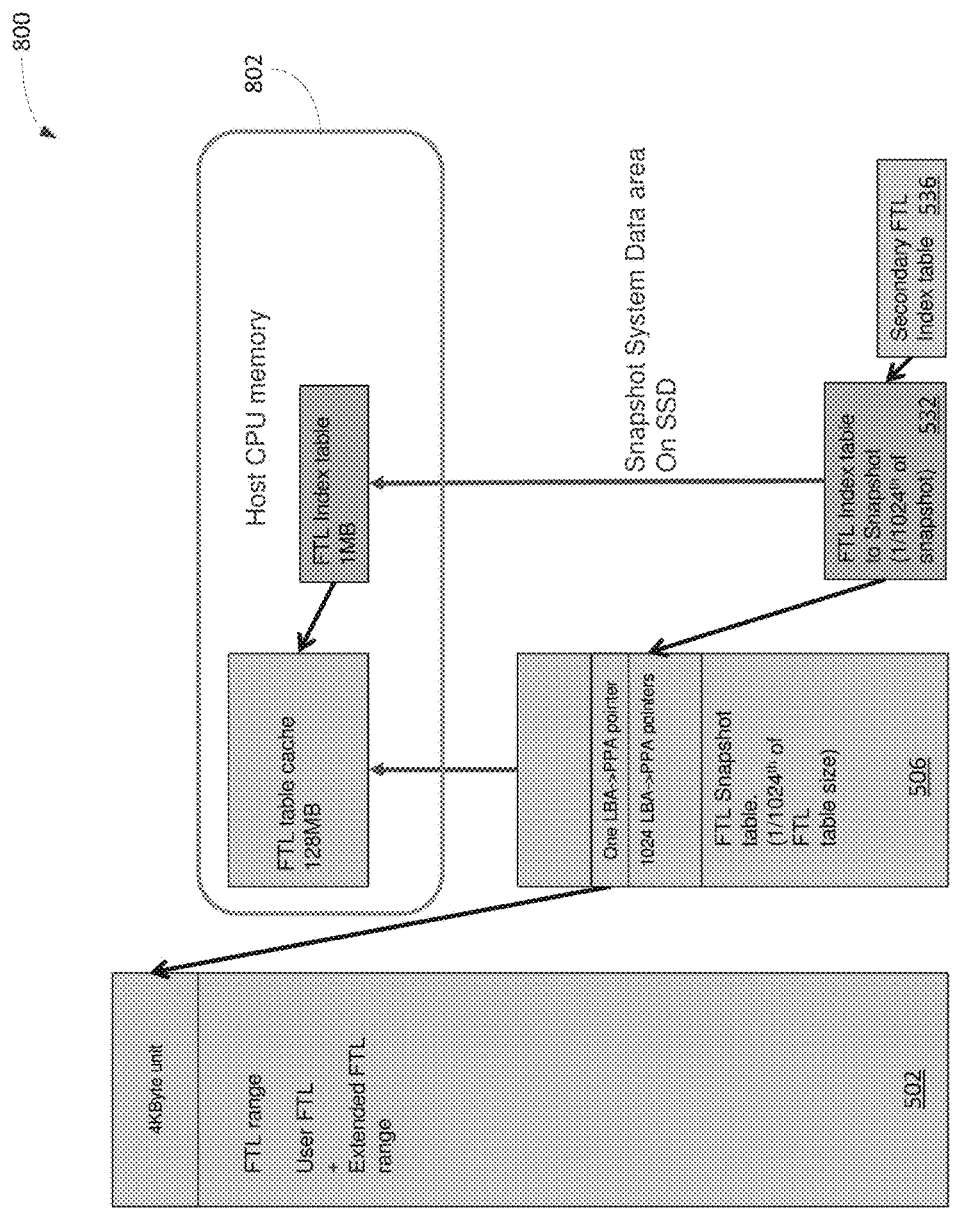
FIG. 8 is a diagram illustrating a host CPU memory containing a portion of FTL table for NVM access in accordance with one embodiment of the present invention.

FIG. 8 is a diagram 800 illustrating a host CPU memory containing a portion of FTL table for NVM access in accordance with one embodiment of the present invention. Diagram 800 is similar to diagram 700 shown in FIG. 7 except that host memory stores a portion of FTL table. Memory 802, in one embodiment, is an onboard memory at a connected host capable of caching a portion of FTL table and FTL index table. In one aspect, memory 802 is used instead of RAM or DRAM storage space in SSD or controller for NVM access using FTL tables. Memory 802 can be a cache memory using high-speed volatile memory cells for executions and operations.

In case of host based FTL cache is used, a smaller FTL table cache, for example, is used in host CPU memory 802 for storing partial FTL table. Alternatively, the entire FTL index table can be stored in the host CPU memory for managing the FTL table cache. An advantage of using the host CPU memory is to conserve storage space in the memory controller.

Figure 9:
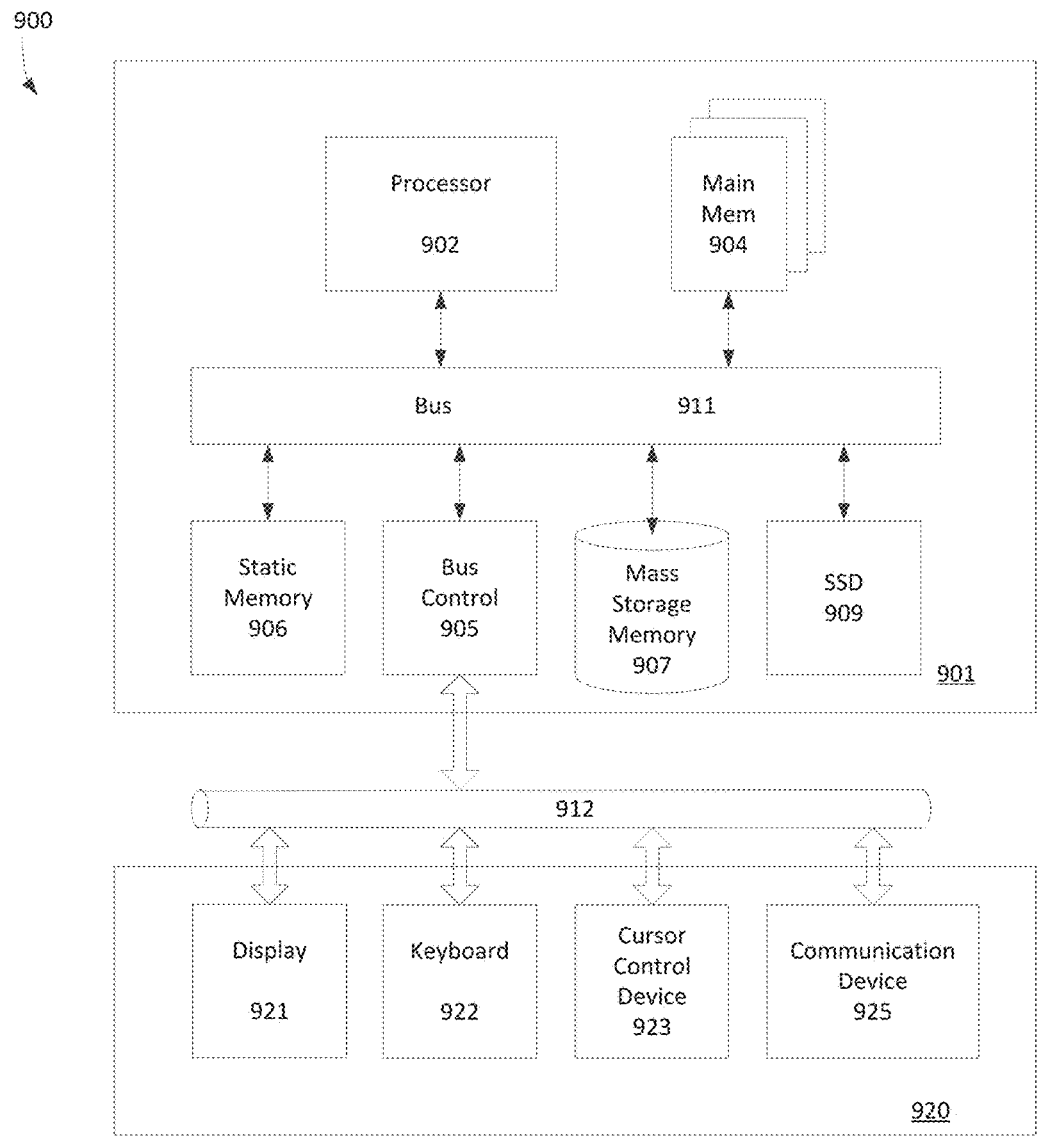
FIG. 9 shows an exemplary embodiment of a digital processing system used for SSD management and/or host in accordance with the present invention.

FIG. 9 shows an exemplary embodiment of a digital processing system used for SSD management and/or host in accordance with the present invention. Computer system 900 includes a processing unit 901, an interface bus 912, and an input/output ("IO") unit 920. Processing unit 901 includes a processor 902, main memory 904, system bus 911, static memory device 906, bus control unit 905, mass storage memory 907, and SSD interface 909. It should be noted that the underlying concept of the exemplary embodiment(s) of the present invention would not change if one or more blocks (circuit or elements) were added to or removed from diagram 900.

Bus 912 is used to transmit information between various components and processor 902 for data processing. Processor 902 may be any of a wide variety of general-purpose processors, embedded processors, or microprocessors such as ARM® embedded processors, Intel® Core™2 Duo, Core™2 Quad, Xeon®, Pentium™ microprocessor, Motorola™ 68040, AMD® family processors, or Power PC™ microprocessor.

Main memory 904, which may include multiple levels of cache memories, stores frequently used data and instructions. Main memory 904 may be RAM (random access memory), PCM, MRAM (magnetic RAM), or flash memory.

Static memory 906 may be a ROM (read-only memory), which is coupled to bus 911, for storing static information and/or instructions. Bus control unit 905 is coupled to buses 911-912 and controls which component, such as main memory 904 or processor 902, can use the bus. Bus control unit 905 manages the communications between bus 911 and bus 912.

I/O unit 920, in one embodiment, includes a display 921, keyboard 922, cursor control device 923, and communication device 925. Display device 921 may be a liquid crystal device, cathode ray tube ("CRT"), touch-screen display, or other suitable display device. Display 921 projects or displays images of a graphical planning board. Keyboard 922 may be a conventional alphanumeric input device for communicating information between computer system 900 and computer operator(s). Another type of user input device is cursor control device 923, such as a conventional mouse, touch mouse, trackball, or other type of cursor for communicating information between system 900 and user(s).

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 10:
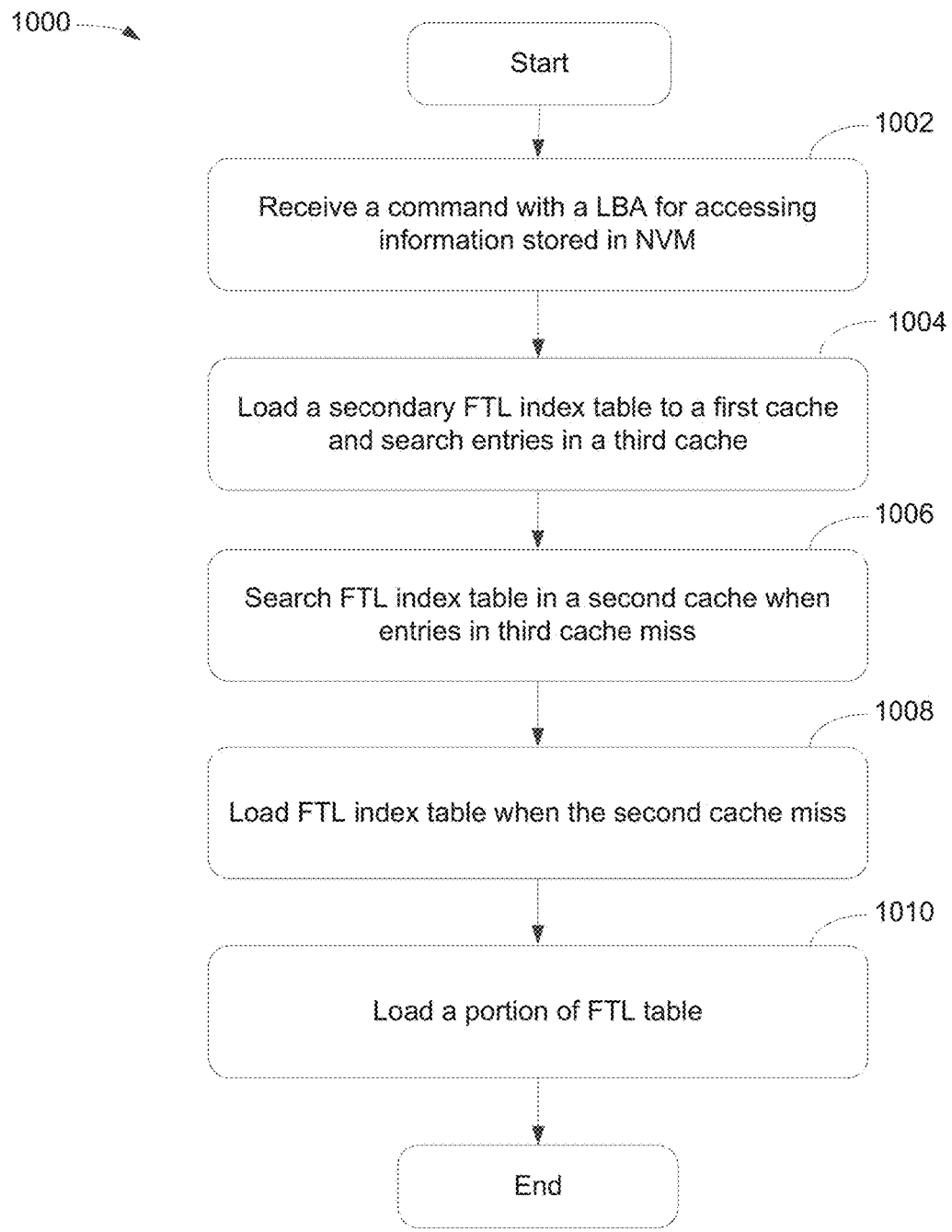
FIG. 10 is a flow diagram illustrating a memory operation to access NVM using a hybrid mode in accordance with embodiments of the present invention.

FIG. 10 is a flow diagram 1000 illustrating a memory operation to access NVM using a hybrid mode in accordance with embodiments of the present invention. At block 1002, a process for persistently data storage receives a command with LBA for accessing information stored in NVM. In one example, to implement a hybrid mode, NVM may be partitioned into a first region accessible by LBAs and a second region accessible by PPA. For instance, the first region is accessible via non-volatile memory express ("NVMe") protocol using LBAs while the second region is accessible via non-volatile memory plus ("NVM++") protocol using PPAs.

At block 1004, a secondary FTL index table is loaded to a first cache and searching third cache to determine entry validity of FTL table according to LBA. The first cache, for example, can also be referred to as secondary FTL index table cache, and the third cache can also be referred to as FTL cache.

At block 1006, an FTL index table is searched in the second cache to identify potential valid FTL table based on received LBA when FTL entries stored in the third cache do not contain valid FTL entries. The second cache, in one example, can be referred to as FTL index table cache.

At block 1008, when the second cache contains invalid FTL index table, the process is able to load a new FTL index table from NVM to the second cache.

At block 1010, a portion of FTL table indexed by FTL index table is loaded in third cache. In one aspect, the entire FTL table is loaded from NVM to a host CPU memory for NVM access. The FTL table is subsequently stored back from the host CPU memory to the NVM when host is ready to be powered down. Alternatively, instead of uploading the entire FTL table, a portion of FTL table is cached from NVM to a host CPU memory for NVM access.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A digital processing system operable to store information, comprising:
    a non-volatile memory ("NVM") with its memory space organized into memory blocks for storing data persistently, wherein the memory blocks are divided into a first region and a second region, the first region configured to store first data addressable by physical page addresses ("PPAs") via a first access protocol, the second region configured to store second data addressable by logical block addresses ("LBAs") via a second access protocol;
    an address mapping table situated in the NVM and organized to include a plurality of entries for accessing to the NVM, each entry of the address mapping table addressed to a physical page of NVM; and
    a memory controller having a random access memory ("RAM") cache coupled to the NVM and configured to cache at least a portion of the address mapping table, an index table configured to index the address mapping table for fast access to a relevant section of the address mapping table, and a secondary index table configured to index the index table for fast access to a relevant section of the index table.

2. The system of claim 1, further comprising a host system coupled to the memory controller via a peripheral interconnect bus and configured to have a processor and host memory.

3. The system of claim 2, wherein the host memory includes a copy of the address mapping table and the index table.

4. The system of claim 1, wherein the address mapping table is a flash translation layer ("FTL") table containing information to facilitate identifying locations of the physical pages.

5. The system of claim 4, wherein the host memory caches a portion of the FTL table and FTL index table for indexing the FTL table.

6. The system of claim 1, wherein the memory controller is configured to interface utilizing a first addressing protocol that utilizes PPAs to access the NVM, and utilizing a second addressing protocol that utilizes LBAs to access the NVM, wherein the first addressing protocol and the second addressing protocol are different protocols.

7. The system of claim 1, wherein the system is a solid state drive ("SSD").

8. The system of claim 1, wherein the NVM is a flash memory based storage device.

9. The system of claim 1, wherein the NVM is a phase change memory ("PCM") or other NVM with limited program cycles based storage device.

10. A method for persistently data storage, comprising:
    receiving a command with a first logical block address ("LBA") for accessing information stored in a non-volatile memory ("NVM");
    searching at least a portion of an FTL table stored in a third cache in a random access memory ("RAM") in accordance with the first LBA to determine validity of the portion of the FTL table;
    searching at least a portion of an FTL index table which is operable to index at least a portion of the FTL table in a second cache in the RAM in accordance with the first LBA to verify validity of the portion of the FTL index table when a portion of the FTL table in the third cache does not contain a valid entry in accordance with the first LBA;
    loading a secondary FTL index table from a first cache in the RAM utilized to index the FTL index table when the portion of the FTL index table in the second cache contains invalid FTL index table in accordance with the first LBA;
    loading a new copy of the FTL index table from the NVM to the second cache based on content of the secondary FTL index table; and
    loading at least a new portion of the FTL table indexed by the FTL index table in response to the first LBA from the NVM to the third cache.

11. The method of claim 10, further comprising partitioning the NVM into a first region accessible by logical block addresses ("LBAs") and a second region accessible by physical page addresses ("PPA").

12. The method of claim 11, further comprising accessing the first region via a first protocol that utilizes LBAs to access the NVM.

13. The method of claim 12, further comprising accessing the second region via a second protocol that utilizes PPAs to access the NVM.

14. The method of claim 10, further comprising loading a new copy of the FTL table from the NVM to a host central processing unit ("CPU") memory for NVM access.

15. The method of claim 11, further comprising storing the FTL table a host central processing unit ("CPU") memory back to the NVM when a host is powering down.

16. The method of claim 10, further comprising caching a portion of FTL table from the RAM to a host central processing unit ("CPU") memory for NVM access.

17. A digital processing system operable to store information, comprising:
    a host having a central processing unit ("CPU") memory and able to access a solid state drive ("SSD");
    a non-volatile memory ("NVM") with its memory space organized into memory blocks for storing data persistently, wherein a first portion of the memory blocks stores first data accessible by a first access protocol utilizing by physical page addresses ("PPAs") and a second portion of the memory blocks stores second data accessible by a second access protocol utilizing logical block addresses ("LBAs"); and
    a controller, coupled to the host and the NVM, configured to have a hybrid interface component and a cache, wherein the hybrid interface component is configured to facilitate accessing the NVM with multiple addressing protocols utilizing PPAs to address the first portion of the memory blocks and LBAs to address the second portion of the memory blocks, wherein the cache stores a portion of flash translation layer ("FTL") table, an FTL index table, and a second FTL index table which is utilized for fast access to a relevant section of the FTL index table.

18. The system of claim 17, wherein the hybrid interface component is able to interface with the NVM via the first access protocol that utilizes LBAs to access the NVM.

19. The system of claim 18, wherein the hybrid interface component is able to interface with the NVM via the second access protocol that utilizes PPAs to access the NVM.

20. The system of claim 17, wherein the CPU memory stores the FTL table and the FTL index table.

* * * * *